United States Patent [19]
Tyler

[11] Patent Number: 5,180,923
[45] Date of Patent: Jan. 19, 1993

[54] METHOD AND APPARATUS FOR DOWNLINE LOAD REJECTION SENSING IN A GAS TURBINE CONTROL SYSTEM

[75] Inventor: Paul J. Tyler, Winter Springs, Fla.

[73] Assignee: Westinghouse Electric Corp., Pittsburgh, Pa.

[21] Appl. No.: 607,921

[22] Filed: Nov. 1, 1990

[51] Int. Cl.⁵ ............................................. F02C 9/28
[52] U.S. Cl. ............................... 290/40 C; 290/40 B
[58] Field of Search .............. 290/40 R, 40 A, 40 B, 290/40 C

[56] References Cited

U.S. PATENT DOCUMENTS

| | | | |
|---|---|---|---|
| 3,601,617 | 8/1971 | De Mello et al. | 290/40 C |
| 4,019,315 | 4/1977 | Yannone et al. | 290/40 A |
| 4,040,250 | 8/1977 | Saunders et al. | 60/39.281 |
| 4,071,870 | 1/1978 | Bloch et al. | 290/40 R |
| 4,136,286 | 1/1979 | O'Halloran et al. | 290/40 C |
| 4,296,600 | 10/1981 | Abo et al. | 60/39.281 |

FOREIGN PATENT DOCUMENTS 0300673 1/1989 European Pat. Off. .
0425835A2A3 5/1991 European Pat. Off. .

OTHER PUBLICATIONS

Brown Boveri Review, vol. 70, No. 3, Mar. 1983 pp. 170–174.

*Primary Examiner*—A. D. Pellinen
*Assistant Examiner*—Robert Lloyd Hoover

[57] ABSTRACT

Method and apparatus for detecting load rejection in a combustion turbine, wherein a speed signal representative of the turbine speed and a load signal representative of the turbine load are provided. The invention includes referencing devices for generating a delta speed reference signal and a delta load reference signal, derivative devices for determining the derivative of the speed signal and the load signal, comparators for comparing the speed derivative to the delta speed reference signal and for comparing the load derivative to the delta load reference signal and an indicator for indicating the occurrence of two events, namely, the first comparator determines that the speed derivative exceeds the delta speed reference signal and the second comparator determines that the load derivative exceeds the delta load reference signal. In one embodiment a maximum turbine speed reference signal is provided and a third comparator compares the speed signal to the maximum turbine speed reference signal. In that embodiment the indicator provides a second indication on the occurrence of the first two events together with a third event, namely, a determination by the third comparator that the speed signal exceeds the maximum turbine speed signal. In a preferred embodiment of the invention, first and second rate monitors are provided for monitoring the rate of change of the speed signal and the load signal and for generating indications when the rate of change of the speed signal and the load signal exceeds predetermined rate of change limits.

23 Claims, 4 Drawing Sheets

METHOD AND APPARATUS FOR DOWNLINE LOAD REJECTION SENSING IN A GAS TURBINE CONTROL SYSTEM

FIELD OF THE INVENTION

The present invention relates generally to the field of control systems for controlling fuel flow in combustion turbine power plants and more particularly to controlling fuel flow during a condition of downline load rejection. Although the present invention may find particular utility in the field of gas turbine electric power plants, and will be described in relation to such equipment, the invention can also be applied to combustion turbines having other uses.

BACKGROUND OF THE INVENTION

In the operation of gas turbines, particularly in electric power plants, various kinds of control systems have been employed from relay-pneumatic type systems, to analog type electronic controls, to digital controls, and more recently to computer based software controls. U.S. Pat. No. 4,308,463—Giras et al., assigned to the assignee of the present invention and incorporated herein by reference, lists several of such prior systems. That patent in particular discloses a digital computer based control system for use with gas turbine electric power plants. It will be noted that the Giras et al. patent is one of a family of patents all of which are cross referenced therein.

Subsequent to the Giras et al. patent, other control systems have been introduced by Westinghouse Electric Corporation of Pittsburgh, Pa. under the designations POWERLOGIC and POWERLOGIC II. Similar to the Giras et al. patent these control systems are used to control gas turbine electric power plants. However, such control systems are primarily micro-processor based computer systems, i.e. the turbine control systems are implemented in software, whereas prior control systems were implemented in electrical and electronic hardware. All modes of turbine-generator operation are controlled including control of fuel flow after the attainment of full load. Loss of full load presents interesting control system problems in relation to fuel flow control.

When load rejection occurs in a combustion turbine-generator arrangement, the initial problem is to control fuel flow in a manner which limits turbine overspeed to a value less than the turbine trip point. If turbine speed exceeds the turbine trip point, fuel flow ceases and a flame out will occur. If load rejection is caused by the opening of the generator circuit breaker, a condition which can be readily detected in relation to the state change of breaker auxiliary contacts, appropriate procedures have been provided in previous combustion turbine control systems to hold the turbine speed set point to synchronous speed for the control of fuel flow. Since the turbine is accelerating due to a loss of load, actual turbine speed will be above the turbine speed set point resulting in a closing of the fuel throttle valve by the control system.

A fuel problem can occur in previous procedures for controlling fuel flow in a generator breaker based load rejection condition. The problem stems from the use of a proportional, integral, differential (PID) controller. Since a PID controller is primarily a high gain proportional control, the greater the difference between actual turbine speed and the turbine speed set point, the further the closure of the fuel throttle that will occur. If the speed difference is great enough, flame out can occur. Prior procedures have been developed to prevent such a flame out condition from occurring in a generator breaker based load rejection situation. Unfortunately, load rejection in a gas turbine/generator arrangement has another form, namely, downline load rejection. Since downline load rejection is not as readily detectable as generator breaker based load rejection, a flame out situation due to turbine speed exceeding the turbine trip point is significantly more probable.

When downline load rejection occurs, two significant events take place. First, the generator breaker remains closed, which in previous control systems allows the speed reference to remain set to the speed equivalent of full turbine load versus synchronous speed. If it is assumed that synchronous speed, i.e., the speed desired for connection of the generator to an electrical power grid, is 3600 RPM and that the turbine generator has a 4% droop governor, i.e., 100% generator power is equivalent to 104% turbine speed, the speed equivalent of full load is 3744 RPM. Second, actual turbine speed drops to approximately 3600 RPM at the instant of load rejection while the speed reference remains at 3744 RPM. The result of these events is that the fuel throttle controller sensing the speed difference between actual turbine speed and the speed reference will cause the fuel throttle valve to open until actual turbine speed exceeds the speed reference, i.e., 3744 RPM. In such a situation, it is more probable that actual speed will exceed the turbine speed trip point.

A need still exists for a turbine-generator control scheme which will sense downline load rejection and maintain the turbine speed reference at a value which minimizes the occurrence of flame out conditions.

Although, the operation of a gas turbine electric power plant is described herein, it should be noted that the invention has broader application to the control of fuel in a gas turbine in a load rejection situation.

SUMMARY OF THE INVENTION

It is an object of the present invention to provide an electric power plant having a combustion turbine driven generator and a controller for efficiently controlling fuel flow during a condition of downline load rejection.

It is another object of the present invention to provide a turbine control system which detects downline load rejection.

It is still another object of the present invention to detect downline load rejection by monitoring turbine speed and generator load.

It is yet another object of the present invention to generate a fuel control signal based upon a speed reference signal set in relation to the detection of a downline load rejection condition.

These and other objects of the invention are achieved by method and apparatus for detecting load rejection in a combustion turbine, wherein a speed signal representative of the turbine speed and a load signal representative of the turbine load are provided. The invention includes referencing devices for generating a delta speed reference signal and a delta load reference signal, derivative devices for determining the derivative of the speed signal and the load signal, comparators for comparing the speed derivative to the delta speed reference signal and for comparing the load derivative to the delta load reference signal and an indicator for indicating the occurrence of two events, namely, the first comparator determines that the speed derivative exceeds the delta speed reference signal and the second comparator determines that the load derivative exceeds the delta load reference signal. In one embodiment a maximum turbine speed reference signal is provided and a third comparator compares the speed signal to the maximum turbine speed reference signal. In that embodiment the indicator provides a second indication on the occurrence of the first two events together with a third event, namely, a determination by the third comparator that the speed signal exceeds the maximum turbine speed signal. In a preferred embodiment of the invention, first and second rate monitors are provided for monitoring the rate of change of the speed signal and the load signal and for generating indications when the rate of change of the speed signal and the load signal exceeds predetermined rate of change limits.

BRIEF DESCRIPTION OF THE DRAWINGS

These and other objects and advantages of the invention will become more apparent from the following detailed description when taken in conjunction with the following drawings, in which.

DETAILED DESCRIPTION OF THE PREFERRED EMBODIMENT

Figure 6:
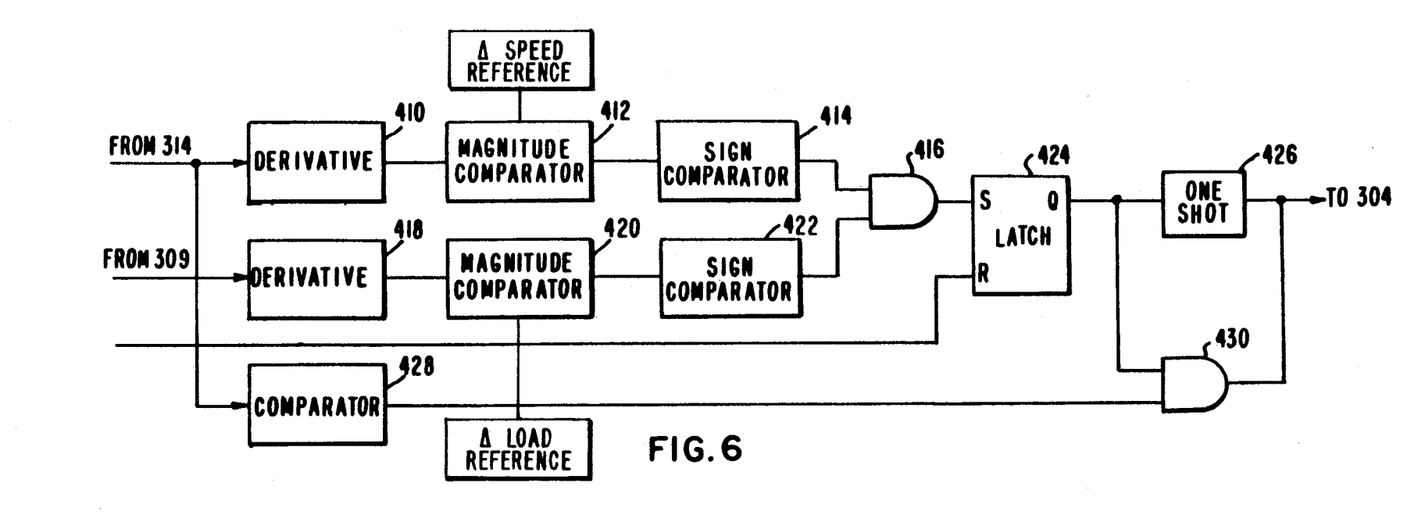
FIGS. 6 and 7 are schematic diagrams of alternative embodiments for detecting downline load rejection in accordance with the present invention.
Figure 7:
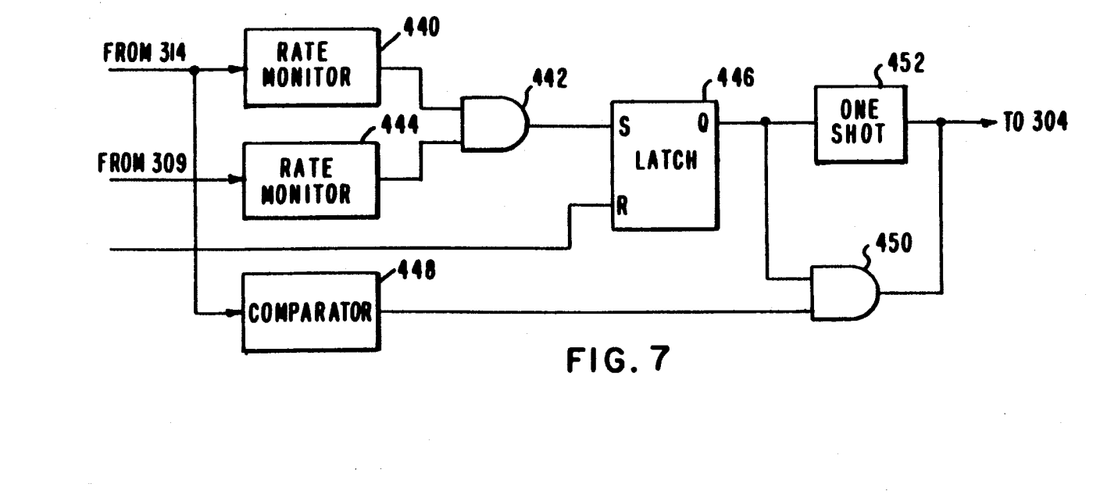

A new and novel system for the detection of downline load rejection in a combustion turbine-generator is described in relation to FIGS. 6 and 7 herein. Although the present invention can be implemented in either software or hardware, in the preferred embodiment it is implemented in software contained in a central processing unit to be described herein. However, before describing the particular program of the present invention consider first an overall description of the operating environment for the invention, namely a gas turbine powered electric power plant. Although the invention is set forth in relation to gas turbine electric power plants, particularly peak load power systems wherein a single gas turbine is utilized as the generator drive, it should be understood that the invention has a wider range of application.

Figure 1:
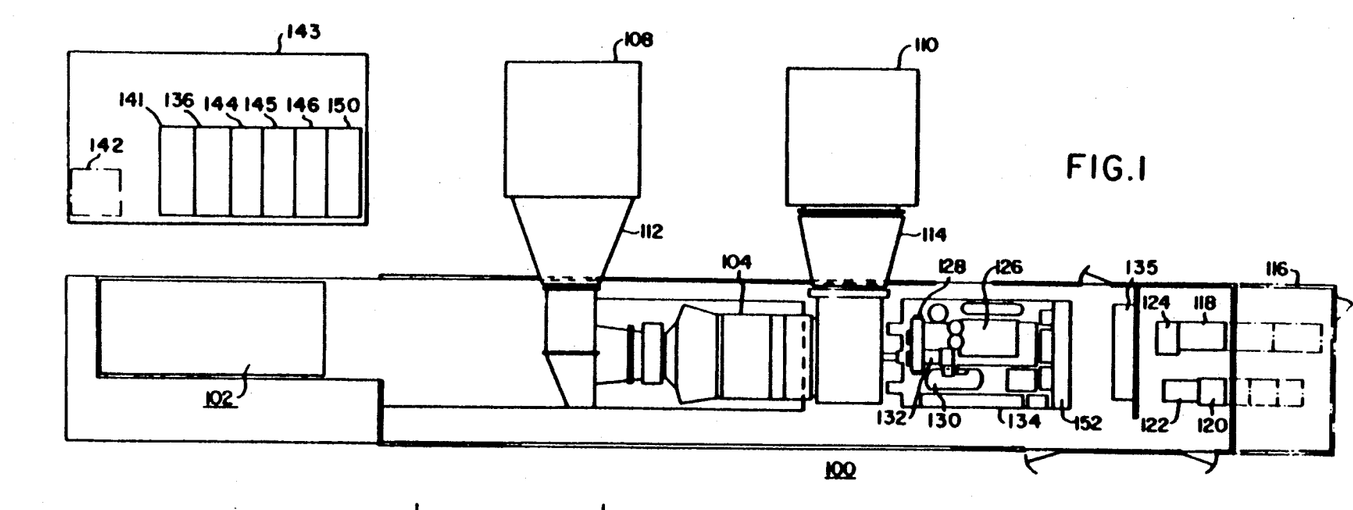
FIG. 1 is a top plan view of a gas turbine power plant arranged to operate in accordance with the principles of the present invention.

There is shown in FIG. 1 a gas turbine electric power plant 100 which includes AC generator 102 driven by combustion or gas turbine 104. In the embodiment described herein, gas turbine 104 is preferably the W 501D5 type manufactured by Westinghouse Electric Corporation.

A typical use of power plant 100 is where continuous power generation is desired and the exhaust heat from gas turbine 104 is desired for other purposes such as feedwater heating, boilers, or economizers. Power plant 100 can be located relatively close to load centers, i.e population centers or manufacturing sites, as indicated by system requirements without the need for a cooling water supply thereby advantageously producing a savings in transmission facilities. Further, power plant 100 is capable of being relatively unattended and automatically operated from a remote location.

Community acceptance of power plant 100 is enhanced by the use of inlet and exhaust silencers 108 and 110 which are coupled respectively to inlet and exhaust ductworks 112 and 114.

In order to gain an appreciation of the size of the power plant described herein, the foundation for plant 100 is approximately 106 feet long if a control station is provided for a single plant unit. The foundation length can be increased as indicated by the reference character 116 to provide for a master control station. A master control station would be warranted if additional plant units, grouped with plant 100, are to have common control. Although the present invention can be utilized in a master control setting for multiple power plants, for simplicity, the invention is described herein in relation to only a single turbine generator.

Micro-processor based computers and other control system circuitry are contained in cabinet 118 and provide operation and control of power plant 100. In the preferred embodiment, cabinet 118 includes Westinghouse Distributed Processing Family (WDPF) equipment sold by Westinghouse Electric Corporation and can include two distributed processing units, an engineers console and a logger. Such other control system circuitry would include appropriate input/output (I/O) circuitry necessary for interfacing the computer control systems with various operating equipment and condition sensors. An operator's cabinet 120, associated with the control cabinet 118, contains vibration monitor, electronics for UV flame detectors, a synchroscope and various push-button switches. A printer 122 and a protective relay panel 124 for sensing abnormal electric power system conditions are associated with the control cabinet 118. The present invention would be implemented in its preferred form in WDPF equipment contained in cabinet 118.

Startup or cranking power for the plant 100 is provided by a starting engine 126 which in the preferred embodiment is an AC motor unit. Starting engine 126 is mounted on an auxiliary bedplate and coupled to the drive shaft of gas turbine 104 through a starting gear unit 128. During the initial startup period, AC motor 126 operates through a turning gear 130 and starting gear 132 to drive the gas turbine. When turbine 104 reaches approximately 20 percent of rated speed, ignition takes place. AC motor 126 continues to operate until turbine 104 reaches sustaining speed. AC motor 126 can be operated for longer periods if turbine disc cavity temperature is excessive, in order to avoid thermally induced shaft bowing.

A motor control center 134 is also mounted on the auxiliary bedplate and it includes motor starters and other devices to provide for operation of the various auxiliary equipment items associated with the plant 100. Electrical breakers for motor control center 134 are preferably front mounted. Various signals from sensor or contact elements associated with motor control center 134 and with other devices mounted on the auxiliary bedplate are transmitted for use in the control system.

A plant battery 135 is disposed adjacent to one end of the auxiliary bedplate or skid. A battery charger is connected to the motor control center 134 through a breaker (not shown). Battery 135 can be any heavy duty control battery such as the EHGS-17 EXIDE rated at 125 volts, 60 cells. In any event, battery 135 should be capable of supplying adequate power for emergency lighting, auxiliary motor loads, computer supply voltages and other control power for one hour following shutdown of the plant 100.

Figure 2:
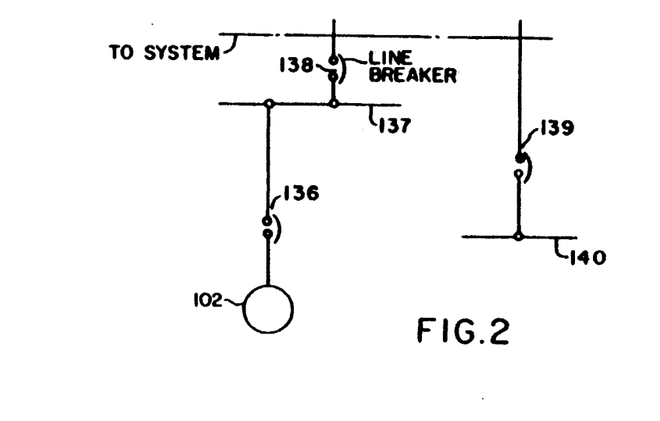
FIGS. 2 and 3 are respective electrical systems useable in the operation of the gas turbine power plant of FIG. 1.

One possible internal electrical power system for use with plant 100 is shown generally in FIG. 2. Once plant 100 is in operation, power generated by generator 102 is transmitted to the power system through generator breaker 136, through 13.8 KV bus 137 to a main transformer (not shown) and line breaker 138. Auxiliary power for the plant 100 is obtained from the internal power system through an auxiliary breaker 139 and an auxiliary power 480 volt bus 140. The generator breaker 136 serves as a synchronizing and protective disconnect device for the plant 100.

Figure 3:
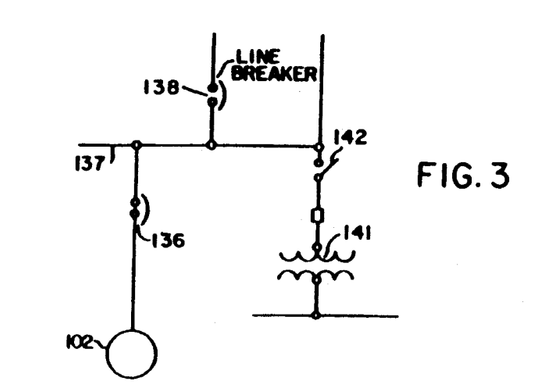

If a suitable 480 volt source is not available in the internal power system, an auxiliary power transformer 141 can be provided as shown in FIG. 3. A disconnect switch 142 is connected between transformer 141 and the station 13.8 KV bus 137. The arrangement as shown in FIG. 3 can provide for so-called black plant startup operation. With this arrangement, gas turbine 104 may be started at any time, since the auxiliaries may be supplied from either generator 102 or the internal power system, whichever is energized. In a black start, i.e. a dead system, gas turbine 104 may be started at any time for availability as a so-called spinning standby power source, even though the external power system, to which plant 100 is connected, is not ready to accept power from generator 102. Further, the circuits shown in FIGS. 2 and 3 allow plant 100 to be separated from an external power system in trouble without shutting down gas turbine 104. The breaker nearest the power system load would be tripped to drop the load and let generator 102 continue to run and supply its own auxiliaries.

An additional advantage of the scheme shown in FIG. 3 is the protection provided if the connection to the power system is vulnerable to a permanent fault between plant 100 and the next breaker in the system. In such a situation line breaker 138 would be the clearing breaker in case of such a fault and the auxiliary system would remain energized by generator 102 which would allow an orderly shutdown of the gas turbine 104 or continued operation as standby.

The arrangement of FIG. 3 is preferable if gas turbine 104 is programmed to start during a system low voltage or decaying frequency situation. During such events, automatic startup could bring turbine 104 up to speed, close generator breaker 136 and supply power to the auxiliary load. The turbine-generator unit would then be running and would be immediately available when desired. The arrangement of FIG. 3 can also be utilized if an under-frequency or under-voltage signal is to be used to separate the gas turbine 104 from the system.

A switchgear pad 143 is included for 15 KV switchgear 144, 145 and 146, including generator breaker 136. The auxiliary power transformer 141 and disconnect switch 142 are also disposed on switchgear pad 143 if they are selected for use by the user. Excitation switchgear 150 associated with the generator excitation system is also included on the switchgear pad 143. As will be described in greater detail hereinafter, the I/O circuitry of cabinet 118 accepts signals from certain sensor or contact elements associated with various switchgear pad devices.

A pressure switch and gauge cabinet 152 is also included on the auxiliary bedplate. Cabinet 152 contains the pressure switches, gauges, regulators and other miscellaneous elements needed for gas turbine operation.

Although not specifically shown, it should be understood that plant 100 also incorporates a turbine high pressure cooling system and a radiation-type air-to-oil cooler for lubrication oil cooling. Such devices can be of any known design.

Figure 4:
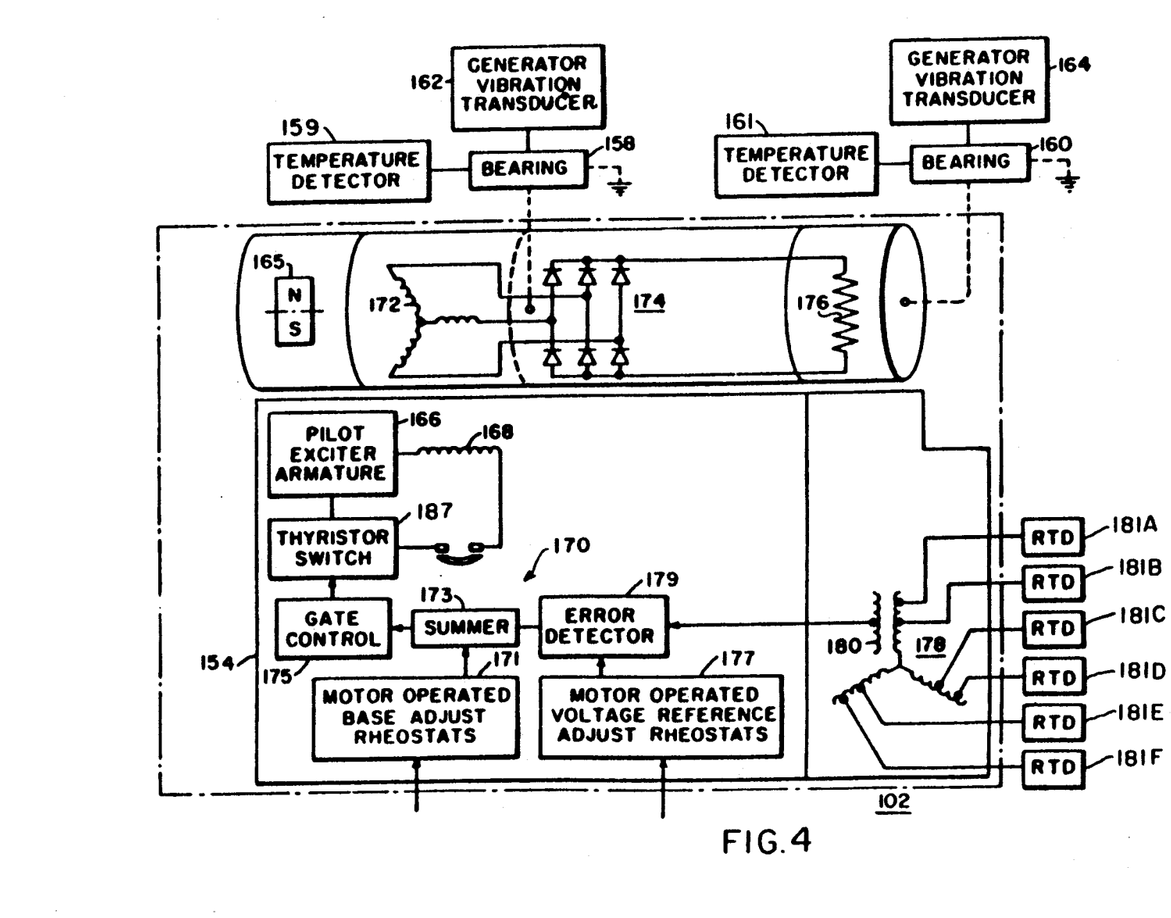
FIG. 4 is a schematic view of a rotating rectifier exciter and a generator employed in the gas turbine power plant of FIG. 1.

Generator 102, including brushless exciter 154, is schematically illustrated in greater detail in FIG. 4. The rotating elements of generator 102 and exciter 154 are supported by a pair of bearings 158 and 160. Conventional generator vibration transducers 162 and 164 are coupled to bearings 158 and 160 for the purpose of generating input data for the plant control system. A grounding distribution transformer with secondary resistors (not shown) is provided to ground the generator neutral.

Resistance temperature detectors (RTD) 181 A-F, embedded in the stator winding, are installed to measure the air inlet and discharge temperatures and the bearing oil drain temperatures as indicated in FIG. 4. Signals from the temperature sensors and vibration transducers 162 and 164 are transmitted to the control system, i.e. cabinet 118.

In the operation of the exciter 154, a permanent magnet field member 165 is rotated to induce voltage in a pilot exciter armature 166 which is coupled to a stationary AC exciter field 168 through a voltage regulator (not shown). Voltage is thereby induced in an AC exciter armature 172 formed on the exciter rotating element and it is applied across diodes mounted with fuses on a diode wheel 174 to energize a rotating field element 176 of the generator 102. Generator voltage is induced in a stationary armature winding 178 which supplies current to the power system through a generator breaker 136 when the plant 100 is synchronized and on the line. A transformer 180 supplies a feedback signal for the regulator 170 to control the excitation level of the exciter field 168. The signal from transformer 180 is also used as the generator megawatt signal, a control signal supplied to cabinet 118. In relation to the present invention, the generator megawatt signal is used as an indication of the generator load on turbine 104.

Generally, exciter 154 operates without the use of brushes, slip rings, and external connections to the generator field. Brush wear, carbon dust, brush maintenance requirements and brush replacement are thereby eliminated.

In the preferred embodiment, all of the exciter parts are supported by generator 102. The generator rotor can be installed and withdrawn without requiring removal of the exciter rotor from the generator shaft.

Consider now the control system utilized in controlling plant 100. Power plant 100 is operated under the control of an integrated turbine-generator computer based control system. The plant control system embraces elements disposed in control cabinet 118, the pressure switch and gauge cabinet 152 and other elements included in the electric power plant 100 of FIG. 1. The control system is characterized with centralized system packaging. Thus, the control cabinet 118 shown in FIG. 1 houses an entire speed/load control package, an automatic plant sequence package, and a systems monitoring package. As a further benefit to the plant operator, turbine and generator operating functions are in the preferred embodiment included on a single operator's panel in conformity with the integrated turbine-generator plant control provided by the control system.

Under automatic control power plant 100 can be operated under local operator control or it can be unattended and operated by remote supervisory control. Further, the plant 100 is started from rest, accelerated under accurate and efficient control to synchronous speed preferably in a normal fixed time period to achieve in the general case extended time between turbine repairs, synchronized manually or automatically with the power system and loaded under preferred ramp control to a preselectable constant or temperature limit controlled load level thereby providing better power plant management.

The starting sequence generally embraces starting and operating the starting engine to accelerate the gas turbine 104 from low speed, stopping the turning gear, igniting the fuel in the combustion system at about 20% rated speed, accelerating the gas turbine to about 60% rated speed and stopping the starting engine, accelerating the gas turbine 104 to synchronous speed, and loading the power after generator breaker 136 closure. During shutdown, fuel flow is stopped and the gas turbine 104 undergoes a deceleration coastdown. The turning gear is started to drive the turbine rotating element during the cooling off period.

A control loop arrangement provides a representation of the preferred general control looping embodied in the control system and applicable in a wide variety of other applications of the invention. Protection, sequencing, more detailed control functioning and other aspects of the control system operation are subsequently considered more fully herein. In the drawings, SAMA (Scientific Apparatus Manufacturers Association) standard function symbols are employed.

Figure 5:
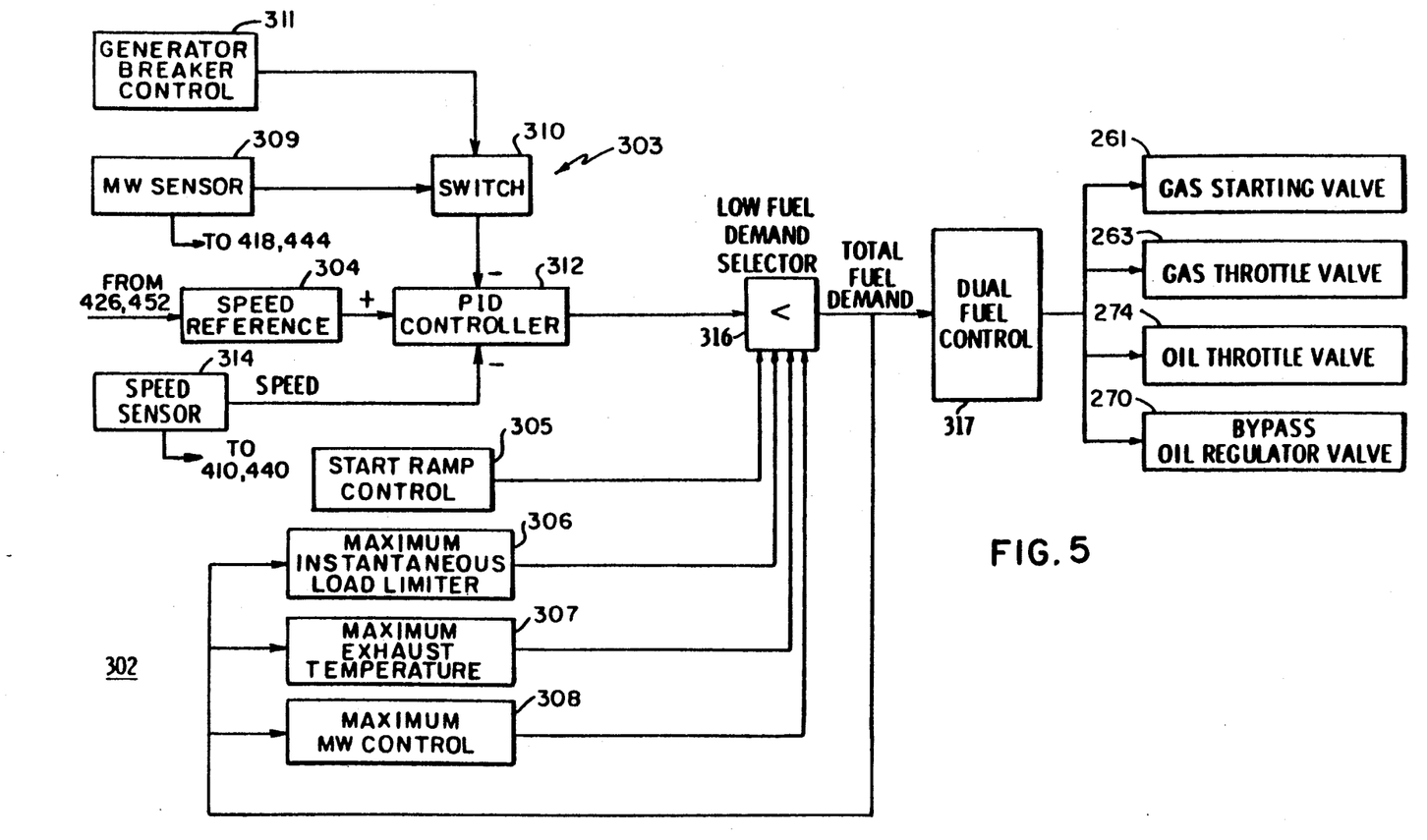
FIG. 5 shows a schematic diagram of a control loop which may be employed in operating the computer control system of FIG. 1.

The control loop arrangement 302 comprises an arrangement of blocks of process control loops for use in operating the gas turbine power plant 100. No delineation is made herein between hardware and software elements since many aspects of the control philosophy can be implemented in hard or soft form.

Generally, a feedforward characterization is preferably used to determine a representation of fuel demand needed to satisfy speed requirements. Measured process variables including turbine speed, ambient temperature and pressure, the controlled load variable or the plant megawatts, combustor shell pressure and turbine exhaust temperature are employed to limit, calibrate or control the fuel demand so that apparatus design limits are not exceeded. The characterization of the feedforward speed fuel demand, a start ramp limit fuel demand and a maximum exhaust temperature limit fuel demand are preferably nonlinear in accordance with the nonlinear characteristics of the gas turbine to achieve more accurate, efficient, available and reliable gas turbine apparatus operation. The control arrangement has capability for maintaining cycle temperature, gas turbine apparatus speed, acceleration rate during startup, loading rate and compressor surge margin.

The fuel demand in the control arrangement provides position control for turbine gas or liquid fuel valves, 263 and 274. Further, the control arrangement can provide for simultaneous burning of gas and liquid fuel and it can provide for automatic bumpless transfer from one fuel to the other when required. The subject of bumpless plant transfer between different fuels and the plant operation associated therewith is known and has been disclosed in U.S. Pat. No. 3,919,623, incorporated herein by reference.

In the combination of plural control loop functions shown in FIG. 5, a low fuel demand selector 316 is employed to limit fuel demand by selecting from various fuel limit representations generated by each control loop. These limit representations are generated respectively by speed control 303, start ramp control 305, maximum exhaust temperature control 307, maximum megawatt control, 308 and maximum instantaneous load pickup limiter 306.

During startup and after ignition, start ramp control 305 provides a closed loop fuel demand to accelerate turbine 104 to approximately 80% rated speed. From 80% speed up to and through synchronization, speed control 303 controls turbine 104 to maintain a constant acceleration and desired speed during synchronization.

After synchronization of generator 102, turbine speed is regulated by the power system frequency if the power system is large. Consequently, after synchronization speed control 303 regulates fuel flow by ramping the speed reference signal, generated at 304 by any known technique, in order to cause a ramping of the megawatt output of generator 102. The present invention, more particularly described in relation to FIGS. 6 and 7, manipulates the speed reference in situations where downline load rejection has been detected to regulate fuel flow.

In the preferred embodiment, turbine speed is controlled during normal operation by proportional, integral, differential (PID) controller 312. A megawatt feedback signal representative of the megawatt output of generator 102 is generated at 309 by any known technique, for example via the signal generated by transformer 180, and is provided to switch 310. Switch 310 provides the megawatt feedback signal to a negative input of controller 312 whenever generator breaker control 311 indicates that the generator breaker has been closed. A signal representative of turbine speed is generated by speed sensor 314, by any known technique, and is provided to another negative input of controller 312. The speed reference signal is provided to the positive input of controller 312.

Since controller 312 will require its inputs to sum zero and since the speed signal from sensor 314 is essentially constant at synchronization, the speed reference signal will be balanced by the megawatt signal such that the output of controller 312 will be representative of a ramping of the speed reference signal to pick up load.

As the turbine load, i.e. generator megawatt output, is increased, control loops 305, 306, 307 and 308 can take control of fuel flow through low fuel demand select 316 if any of the maximum limit conditions are exceeded. This will indeed happen as the exhaust temperature increases with increasing megawatt output. The maximum exhaust temperature control 307 will eventually control fuel flow to turbine 104 to the maximum allowed temperature.

At low ambient temperatures, maximum megawatt control 308 will become low selected before maximum temperature control 307 becomes effective.

At the output of the low fuel demand selector 316, the fuel demand representation is applied to a dual fuel control where the fuel demand signal is processed to produce a gas fuel demand signal for application to the gas starting and throttle valves or a liquid fuel demand signal for application to the oil throttle and pressure bypass valve or as a combination of gas and liquid fuel demand signals for application to the gas and oil valves together.

The control arrangement generally protects gas turbine apparatus against factors including too high loading rates, too high speed excursions during load transients, too high speed at generator breaker close, too high fuel flow which may result in overload, too low fuel flow which may result in combustor system outfires during all defined modes of operation, compressor surge, and excessive turbine inlet exhaust and blade over-temperature. Further, the control arrangement meets all requirements set forth in the NEMA (National Equipment Manufacturers Association) publication "Gas Turbine Governors", SM32-1960 relative to system stability and transient response and adjustment capability. As augmented by the embodiments of the present invention illustrated in FIGS. 6 and 7, control arrangement also promotes efficient operation of the gas turbine during downline load rejection conditions.

The apparatus and method for detecting downline load rejection, i.e. load rejection while generator breaker 136 remains closed, is more particularly shown in FIGS. 6 and 7. As indicated previously, the method and apparatus of the present invention is preferably implemented in programming contained in cabinet 118 (FIG. 1). Generally, the present invention serves to detect downline load rejection conditions despite generator breaker 136 being closed and serves to fix the speed reference signal at a suitable level until turbine overspeed is controlled.

As shown in FIG. 6, the turbine speed signal generated at 314 (FIG. 6) is provided to a first derivative generator 410. Generator 410 determines the derivative of the speed signal which derivative thereby defines a speed derivative. In the preferred embodiment such speed derivative is reflective of the derivative of the speed signal with respect to time. The speed derivative is thereafter provided to comparator 412 which compares the magnitude of the speed derivative to the magnitude of a preselected delta speed reference. If the magnitude of the speed derivative is greater than the magnitude of the preselected delta speed reference the speed derivative is thereafter provided to comparator 414. Comparator 414 determines whether the sign of the speed derivative is positive. If the sign of the speed derivative is positive a logic high signal is provided to AND gate 416. At all other times, the output of comparator 414 remains low.

Concurrently with the processing of the speed signal, a load signal representative of the turbine load is provided to a second derivative generator 418. In the preferred embodiment this load signal is representative of the load on generator 102 and is provided by transformer 180. In the preferred embodiment this load signal is converted to a digital signal prior to application to derivative generator 418. Generator 418 determines the derivative of the load signal, which in the preferred embodiment is with respect to time. The derivative of the load signal defines a load derivative. The load derivative is thereafter provided to comparator 420. Comparator 420 compares the magnitude of the load derivative to the magnitude of a preselected delta load reference. If the magnitude of the load derivative exceeds the magnitude of the preselected delta load reference, the load derivative is provided to comparator 422. Comparator 422 determines whether the sign of the load derivative is positive or negative. If the sign of the load derivative is negative, the output of comparator 422 is a logic high which is provided to AND gate 416. Upon receipt of logic high signals at both inputs of AND gate 416, the output will become logic high which is connected to the set input of a set/reset flipflop 424. The "Q" output of flipflop 424 enables a monostable multivibrator 426. The output of multivibrator 426 is provided to the speed reference generator 304. In the preferred embodiment, a logic high signal from vibrator 426 serves to set the speed reference signal to be representative of 3600 rpm.

As will be appreciated from the above, a logic high output from AND gate 416 is representative of turbine speed increasing in excess of a predetermined rate and generator load decreasing in excess of a predetermined rate. In a preferred embodiment wherein a W501D5 combustion turbine-generator arrangement, the preselected delta speed reference is approximately equal to 100 rpm per second and the preselected delta load reference is approximately equal to minus 200 megawatts per second. A reset signal is provided by a central processor (not shown) when turbine speed reaches synchronous speed, i.e. 3600 rpm.

There will also be noted that the speed signal is provided to comparator 428. Comparator 428 compares the speed of the turbine to a preselected value which is slightly above synchronous speed. In the preferred embodiment, this preselected value is approximately equal to 3672 rpm. If turbine speed is greater than the preselected speed value a logic high signal is provided by comparator 428 to AND gate 430. The other input of AND gate 430 is connected to the "Q" output of flipflop 424. As will be appreciated from this arrangement, once a downline load rejection has been detected, a logic high output will appear at flipflop 424. Since turbine speed will generally be above synchronous speed, i.e. 104 percent of rated speed or 3744 rpm, a logic high output will also appear at comparator 428 which in turn results in a logic high output appearing at AND gate 430. The provision of a logic high output from AND gate 430 to speed reference 304 serves to set the speed reference to slightly below synchronous speed until the actual speed returns to a value just below the reference speed utilized by comparator 428. In the preferred embodiment, a logic high output from AND gate 430 serves to set the speed reference at approximately 3200 rpm. Once the actual speed drops below that value utilized by comparator 428, a logic low output will appear from AND gate 430 and the remaining logic high output from multivibrator 426 will serve to set the speed reference at synchronous speed or 3600 rpm.

An especially preferred embodiment of the present invention is depicted in FIG. 7. As shown in FIG. 7, the speed signal from speed sensor 314 is provided to rate monitor 440. Rate monitor 440 monitors the rate at which speed is changing and whether such change is positive or negative, i.e. increasing or decreasing. Such a rate monitor is presently known and has been implemented in WDPF Software and is available as a building block for software design. Although such rate monitor is known, its use as described in relation to the present invention is not known. A logic high output from rate monitor 440 indicates that the speed is changing in a fashion which exceeds predetermined speed change limits. In the preferred embodiment, the speed change limits are identical to those utilized in relation to comparators 412 and 414. If rate monitor 440 detects that the speed is changing in excess of the speed change limits a logic high output is provided to AND gate 442. The load signal is provided to rate monitor 444 which monitors the rate of change of the load signal. Monitor 444 generates a logic high output when the rate of change of the load signal exceeds the predetermined load change limits. In the preferred embodiment, the predetermined load change limits are identical to those utilized by comparators 420 and 422. When a logic high signal appears at both inputs to AND gate 442, a logic high output is provided to the set input of set/reset flipflop 446.

The speed signal is also provided to comparator 448 which determines whether speed is in excess of a preselected speed. The preselected speed utilized by comparator 448 is identical to that utilized by comparator 428. If the speed is in excess of the preselected speed a logic high output is presented to AND gate 450. The "Q" output of flipflop 446 is also connected to AND gate 450 and monostable multivibrator 452.

Similar to the operation described in relation to FIG. 6, if the magnitude and sign of the load and speed signals exceeds the magnitude and sign of the predetermined speed change limits and the predetermined load change limits, a logic high output is presented to flipflop 446 which in turn results in a logic high signal being presented to the input of AND gate 450 and multivibrator 452. Similar to AND gate 430, AND gate 450 holds the speed reference to a value which is slightly less than synchronous speed, i.e. approximately 3200 rpm. Once turbine speed drops below the value utilized by comparator 448, multivibrator 452 serves to set the speed reference at synchronous speed, namely 3600 rpm.

While the invention has been described and illustrated with reference to specific embodiments, those skilled in the art will recognize that modification and variations may be made without departing from the principles of the invention as described herein above and set forth in the following claims.

I claim:

1. Apparatus for detecting load rejection in a combustion turbine, wherein a speed signal representative of the turbine speed and a load signal representative of the turbine load are provided, said apparatus comprising:
   first reference means for generating a delta speed reference signal;
   second reference means for generating a delta load reference signal;
   first derivative means, connected to receive said speed signal, for determining the derivative of said speed signal, such derivative defining a speed derivative;
   second derivative means, connected to receive said load signal, for determining the derivative of said load signal, such derivative defining a load derivative;
   first comparator means, connected to receive said speed derivative and said delta speed reference signal, for comparing the speed derivative to said delta speed reference signal;
   second comparator means, connected to receive said load derivative and said delta load reference signal, for comparing the load derivative to said delta load reference signal; and
   an indicator for indicating when both said first comparator means determines that said speed derivative exceeds said delta speed reference signal and said second comparator means determines that said load derivative exceeds said delta load reference signal.

2. The apparatus of claim 1, wherein said speed derivative is determined by taking the derivative of said speed signal with respect to time.

3. The apparatus of claim 1, wherein said load derivative is determined by taking the derivative of said load signal with respect to time.

4. The apparatus of claim 1, wherein said delta speed reference and said speed derivative have a magnitude and a sign and wherein said first comparator means compares the magnitude and sign of said delta speed signal with the magnitude and sign of said speed derivative.

5. The apparatus of claim 4, wherein said delta load reference and said load derivative have a magnitude and a sign and wherein said second comparator means compares the magnitude and sign of said delta load signal with the magnitude and sign of said load derivative.

6. The apparatus of claim 5, wherein said indicator provides an indication when said first comparator determines that the magnitude and sign of said speed derivative exceeds the magnitude and sign of said delta speed reference signal and said second comparator determines that the magnitude and sign of said load derivative exceeds the magnitude and sign of said delta load reference signal.

7. The apparatus of claim 1, wherein a maximum turbine speed reference signal is provided and further comprising a third comparator, connected to receive said maximum turbine speed reference signal and said speed signal, for comparing said speed signal to said maximum turbine speed reference signal and wherein said indicator provides an indication when said first comparator determines that said speed derivative exceeds said delta speed reference signal, when said second comparator determines that said load derivative exceeds said delta load reference signal and when said third comparator determines that said speed signal exceeds said maximum turbine speed signal.

8. The apparatus of claim 1, wherein said combustion turbine is connected to a generator and wherein 9. Apparatus for detecting load rejection in a combustion turbine, wherein a speed signal representative of the turbine speed and a load signal representative of the turbine load are provided, said apparatus comprising:
   a first rate monitor, connected to receive said speed signal for monitoring the rate of change of said speed signal and for generating a speed indication signal when the rate of change of said speed signal exceeds predetermined speed change limits;
   a second rate monitor, connected to receive said load signal for monitoring the rate of change of said load signal and for generating a load indication signal when the rate of change of said load signal exceeds predetermined load change limits; and
   an indicator for indicating when both of said first and second rate monitors are indicating that said speed change limits and said load change limits have been exceeded.

10. The apparatus of claim 9, wherein said first rate monitor is monitoring the magnitude and sign of the rate of change in said speed signal.

11. The apparatus of claim 10, wherein said second rate monitor is monitoring the magnitude and sign of the rate of change in said load signal.

12. The apparatus of claim 11, wherein the speed change and the load change limits each comprise a magnitude and a sign and wherein said indicator provides an indication when said first rate monitor determines that the magnitude and sign of the rate of change of said speed signal exceeds the magnitude and sign of said speed change limits and said second rate monitor determines that the magnitude and sign of the rate of change of said load signal exceeds the magnitude and sign of said load change limits.

13. The apparatus of claim 12, wherein said speed change limits and said load change limits are selected so that an indication from said indicator is reflective of increasing speed and decreasing load.

14. The apparatus of claim 9, wherein a maximum turbine speed reference signal is provided and further comprising a comparator, connected to receive said maximum turbine speed reference signal and said speed signal, for comparing said speed signal to said maximum turbine speed reference signal and wherein said indicator provides an indication when said first and second rate monitors are indicating that said speed change limits and said load change limits have been exceeded and when said comparator determines that said speed signal exceeds said maximum turbine speed signal.

15. An electric power plant for generating electric power and for providing such power to an electric power grid, said power plant comprising:
  a combustion turbine, the combustion turbine being operative in response to the combustion of fuel in the turbine wherein the flow of fuel is regulated in response to a control signal;
  a generator, connected to the power grid, so that electric power is produced when the turbine shaft turns;
  a first reference member for generating a speed signal reflective of turbine speed;
  a second reference member for generating a load signal reflective of the load on the generator;
  a controller for generating a control signal in relation to the difference between the speed signal and a speed reference signal; and
  a third reference member for generating said speed reference signal, said third reference member comprising:
    a first rate monitor, connected to receive said speed signal for monitoring the rate of change of said speed signal and for generating a speed indication signal when the rate of change of said speed signal exceeds predetermined speed change limits;
    a second rate monitor, connected to receive said load signal for monitoring the rate of change of said load signal and for generating a load indication signal when the rate of change of said load signal exceeds predetermined load change limits; and
    a signal generator for generating said speed reference signal, wherein said speed reference signal is representative of synchronous speed when both of said first and second rate monitors are indicating that said speed change limits and said load change limits have been exceeded.

16. The power plant of claim 15, further comprising a fourth reference member for generating a maximum turbine speed reference signal and a comparator, connected to receive said maximum turbine speed reference signal and said speed signal, for comparing said speed signal to said maximum turbine speed reference signal and wherein said speed reference signal is representative of an intermediate set point speed when said first and second rate monitors are indicating that said speed change limits and said load change limits have been exceeded and when said comparator determines that said speed signal exceeds said maximum turbine speed signal.

17. A method for detecting load rejection in a combustion turbine, wherein a speed signal representative of the turbine speed and a load signal representative of the turbine load are provided, said method comprising the steps of:
  generating a delta speed reference signal;
  generating a delta load reference signal;
  determining the derivative of said speed signal, such derivative defining a speed derivative;
  determining the derivative of said load signal, such derivative defining a load derivative;
  comparing the speed derivative to said delta speed reference signal;
  comparing the load derivative to said delta load reference signal; and
  indicating when both said speed derivative exceeds said delta speed reference signal and said load derivative exceeds said delta load reference signal.

18. The method of claim 17, wherein said step of determining the speed derivative is determined by taking the derivative of said speed signal with respect to time.

19. The method of claim 18, wherein said step of determining the load derivative is determined by taking the derivative of said load signal with respect to time.

20. The method of claim 17, wherein said delta speed reference and said speed derivative have a magnitude and a sign and wherein said step of comparing the speed derivative to said delta speed reference signal comprises comparing the magnitude and sign of said delta speed reference signal with the magnitude and sign of said speed derivative.

21. The method of claim 20, wherein said delta load reference and said load derivative have a magnitude and a sign and wherein said step of comparing the load derivative to said delta load reference signal comprises comparing the magnitude and sign of said delta load signal with the magnitude and sign of said load derivative.

22. The method of claim 17, wherein a maximum turbine speed reference signal is provided and further comprising the steps of comparing said speed signal to said maximum turbine speed reference signal and wherein said step of indicating comprises providing an indication of when said speed derivative exceeds said delta speed reference signal, when said load derivative exceeds said delta load reference signal and when said speed signal exceeds said maximum turbine speed signal.

23. A method for detecting load rejection in a combustion turbine, wherein a speed signal representative of the turbine speed and a load signal representative of the turbine load are provided, said method comprising the steps of:
  monitoring the rate of change of said speed signal and generating a speed indication signal when the rate of change of said speed signal exceeds predetermined speed change limits;
  monitoring the rate of change of said load signal and generating a load indication signal when the rate of change of said load signal exceeds predetermined load change limits; and
  providing an indication signal when both of said speed change limits and said load change limits have been exceeded.

* * * * *